No. 732,992. Patented July 7, 1903.

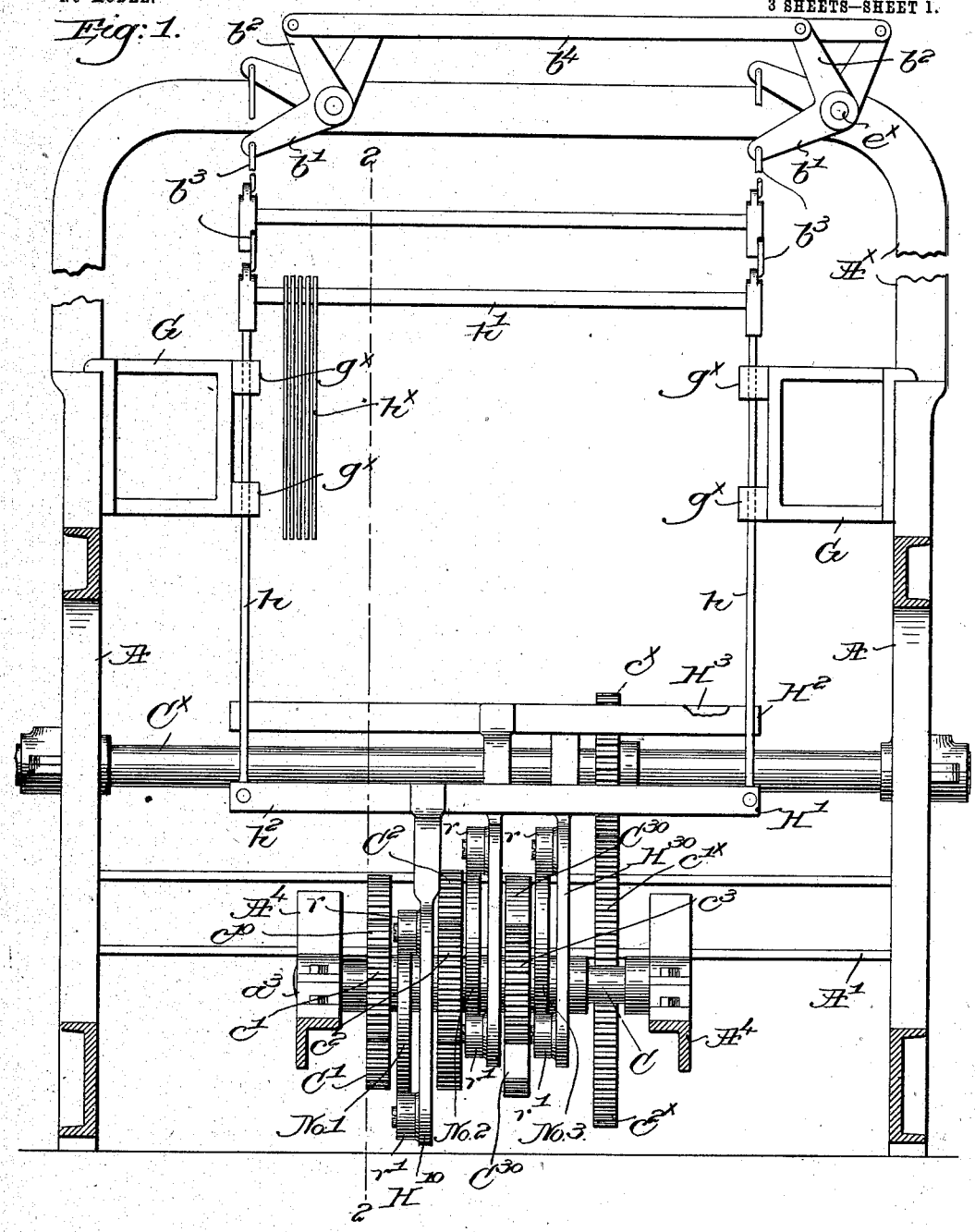

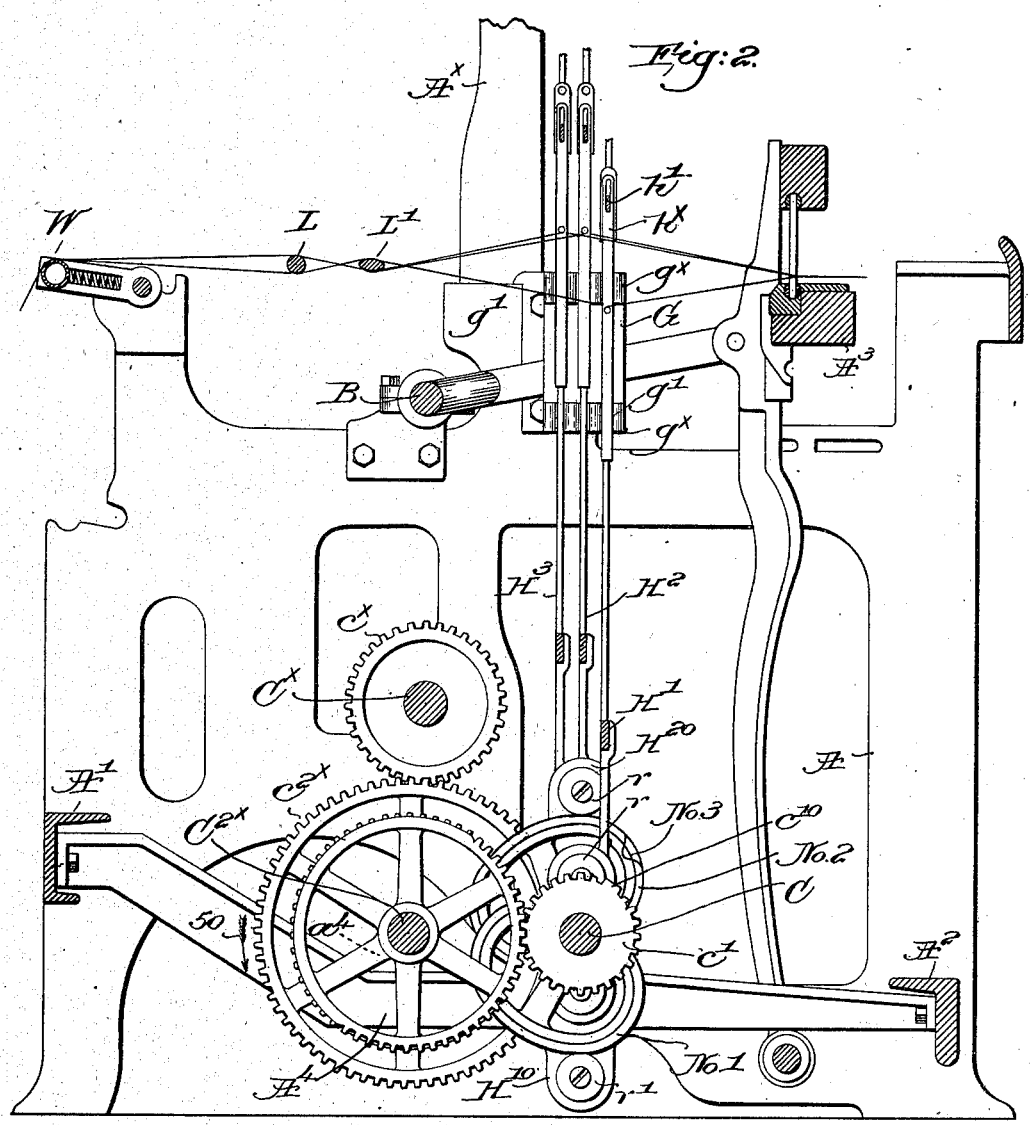

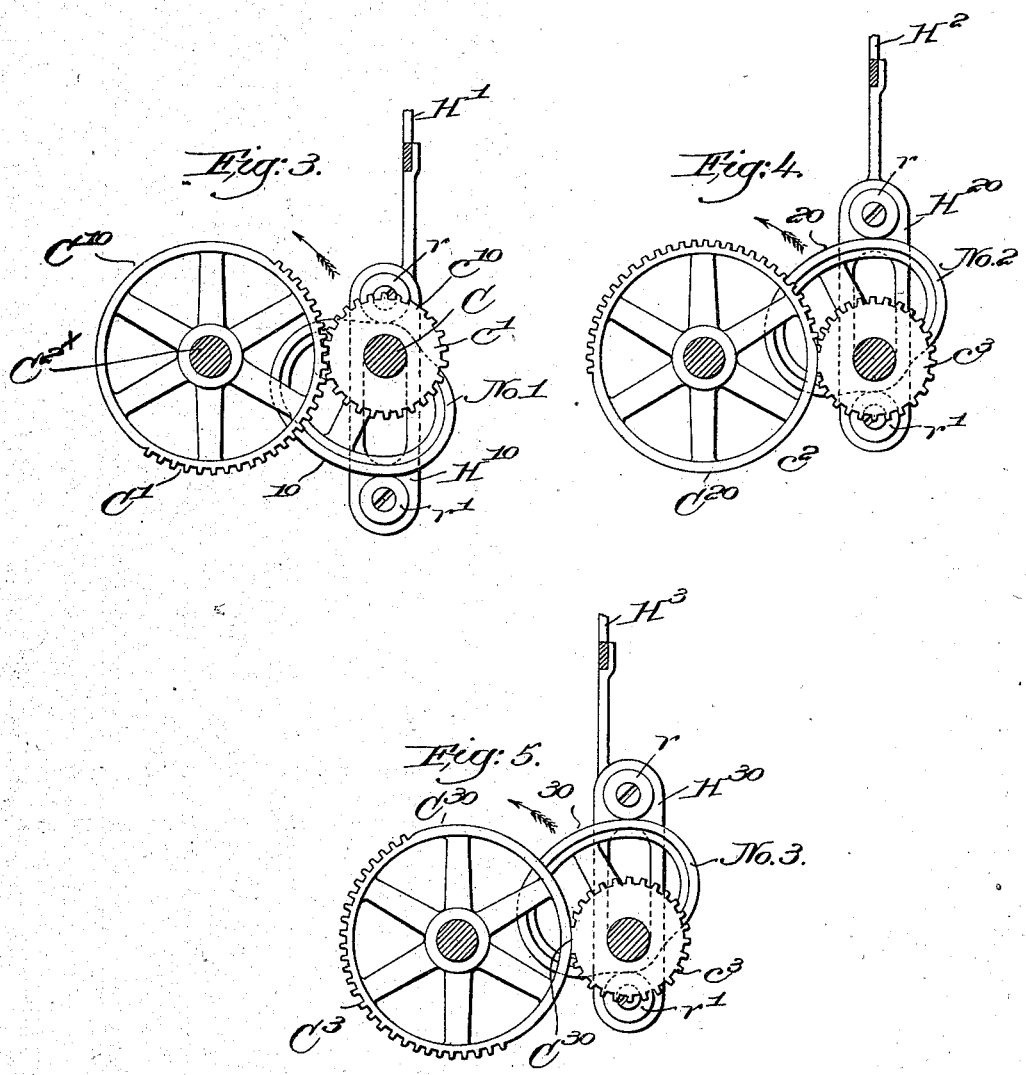

UNITED STATES PATENT OFFICE.

GEORGE B. AMBLER, OF HOPEDALE, MASSACHUSETTS, ASSIGNOR TO DRAPER COMPANY, OF HOPEDALE, MASSACHUSETTS, A CORPORATION OF MAINE.

SHEDDING MECHANISM FOR LOOMS.

SPECIFICATION forming part of Letters Patent No. 732,992, dated July 7, 1903.

Application filed October 24, 1902. Serial No. 128,545. (No model.)

*To all whom it may concern:*

Be it known that I, GEORGE B. AMBLER, a citizen of the United States, and a resident of Hopedale, county of Worcester, State of Massachusetts, have invented an Improvement in Shedding Mechanism for Looms, of which the following description, in connection with the accompanying drawings, is a specification, like characters on the drawings representing like parts.

This invention relates to looms for weaving, and more particularly to mechanism for effecting the formation of the shed.

One of the objects of my invention is the production of means for effecting individual and positive reciprocation of the several harness members of a set, any harness member being at all times under direct control of its actuating means and being moved positively in both directions.

Another object of my invention is the provision of means for automatically locking a harness member in one or the other of its extreme positions to thereby maintain it at rest for a predetermined period while some other harness or harnesses may be acting, the locking being effected independently of any "dwell" which may be due to the structure or operation of the actuating means for the harness. Such dwell is that which in an active harness is provided to enable the shed to remain open long enough for the proper passage of the shuttle therethrough.

Another object of my invention is the simplification of mechanism and the elimination of connections between different harnesses at one end thereof, the actuating means for the several harnesses being localized and arranged in a very compact manner.

These and other novel features of my invention will be hereinafter described in detail in the subjoined specification and particularly pointed out in the following claims.

Figure 1 is a front view, broken out at the top, of shedding mechanism embodying one form of my invention applied to a sufficient portion of a loom to be understood, the principal parts illustrated being those behind the section-line 1 1, Fig. 2. Fig. 2 is a transverse sectional view of a portion of a loom with my invention applied thereto, taken on the line 2 2, Fig. 1, looking toward the right, the lay and other parts omitted in Fig. 1 being shown in Fig. 2; and Figs. 3, 4, and 5 are details in side elevation, for the greater part, showing the actuating and controlling means for the three harness members illustrated in Figs. 1 and 2, the several views being separated to more clearly show the relative position of the various parts at a given instant.

The loom sides A, arch $A^\times$, erected thereupon, the cross-girths $A'$ $A^2$, Fig. 2, lay $A^3$, crank-shaft B, whip roll or bar W, lease-rods L L', and the shaft $C^\times$, corresponding to the usual cam-shaft of a loom, may be and are all substantially of well-known or usual construction.

Hangers $A^4$, bolted to the cross-girths $A'$ $A^2$ between the loom sides and clearly shown in Fig. 2, are provided with bearing-boxes $a^4$, Fig. 2, for an auxiliary shaft $C^{2\times}$, having fast upon it a gear $c^{2\times}$ in mesh with a smaller gear $c^\times$, fast on the shaft $C^\times$, it being understood that this latter shaft is driven in usual manner from the crank-shaft B, the connections therebetween being omitted herein, the arrow 50, Fig. 2, showing the direction of rotation of shaft $C^{2\times}$. Boxes or stands $a^3$ on the hangers support a shaft C below the "harness members," "frames," or "harnesses," as they are frequently termed, three being herein shown and indicated at $H'$ $H^2$ $H^3$, each one comprising top and bottom cross-bars $h'$ $h^2$ and upright side bars $h$, connecting them.

Herein it is assumed that a "steel harness," so called, is employed, the detector-heddles $h^\times$ thereof being suspended from the top cross-bar $h'$ of a frame.

The shaft C may appropriately be termed the "cam-carrying shaft," inasmuch as the harness-cams are mounted thereupon; but the cams are rotated independently of each other, as will be described, and they are rotatably mounted on the shaft, the latter serving as a support rather than as an actuating means for the cams, and in this respect it differs essentially and widely from the usual cam-shaft in a loom on which the harness-cams are made fast and operated by its rotation.

In accordance with my present invention each harness-frame is operatively connected with its own actuating-cam in such manner that it is pulled thereby in one direction and pushed in the opposite direction and always under the positive control of the cam, the movement of any harness-frame being independent of the movement of any other. In other words, the harness-frames are actuated and controlled individually, and manifestly my invention is more particularly adapted for multiple-harness mechanism wherein more than two harness-frames are employed.

The cams for actuating the several harness-frames are for convenience designated as No. 1, No. 2, and No. 3, beginning with that one nearest the left-hand side of the loom, and, as shown in Figs. 3, 4, and 5, the cams are alike, each having a dwell portion, as 10 20 30, to effect the necessary dwell of the active harness-frame and maintain the shed open for the passage of the shuttle and also to provide the cloth with a "soft" appearance or face.

Mutilated pinions $c'$ $c^2$ $c^3$ are secured to or form a part of each of the cams referred to, these pinions having a like number of teeth, the non-toothed parts of said pinions being indicated at $c^{10}$ $c^{20}$ $c^{30}$, respectively, and having a certain angular position with relation to the dwell of the corresponding cam for a purpose to be described. The outer face of the non-toothed portion is concaved and has the same curvature as the toothless segment of the actuating-gear, to be described, which intermittingly rotates each pinion and its cam and at times locks the same from rotative movement.

The shaft $C^{2\times}$ has fast thereon a series of gears $C'$ $C^2$ $C^3$ of like diameter and arranged to coöperate, respectively, with the corresponding cam-pinions, the said gears being mutilated and presenting toothless segmental portions $C^{10}$ $C^{20}$ $C^{30}$, respectively, and clearly shown in Figs. 3 to 5. Referring to these figures and comparing them with Fig. 2, it will be seen that No. 1 harness-frame, or $H'$, is down and frames $H^2$ and $H^3$ are both up and the cams Nos. 2 and 3 and their pinions are in the same angular position; but the corresponding actuating-gears are set differently on their shaft $C^{2\times}$—that is, the dwell portion of the cam No. 1 is in control of the frame $H'$; but the cam is being rotated, because the toothed portion of the pinion $c'$ is in mesh with the gear $C^{10}$, direction of rotation being indicated by the arrows. The dwell portion 20 of cam No. 2 is in position to control the harness-frame $H^2$; but said cam is at rest and locked from movement, because the toothless part $c^{20}$ of its pinion has just come opposite and into coöperation with the segment $C^{20}$ of its actuating-gear, and the cam will remain at rest until the latter has made one-half a revolution in the present arrangement. Consequently the frame $H^2$ is maintained at rest in lifted position and will so remain until gear and pinion again mesh irrespective of the particular contour of the cam No. 2.

Referring now to Fig. 5, it will be seen that harness-frame $H^3$ is also raised and that its cam, No. 3, is at rest, owing to the coöperation of the toothless portions of pinion $c^3$ and gear $C^3$; but in slightly less than a quarter-revolution of said gear it will be brought into mesh with the pinion and the cam will begin to rotate. Thus the means by which the several cams are rotated constitute a species of pattern mechanism governing the sequence in which one or more of the harness-frames shall be rendered active or locked in inactive condition, indirectly controlling the harness-frames through the direct control thereof effected by their cams.

I have herein provided a direct double-acting and positive connection between each harness-frame and its actuating-cam, so that the reciprocation of the frames is effected positively by or through the respective cams. To this end the bottom cross-bars of the several frames are provided with depending rigidly-attached feet $H^{10}$ $H^{20}$ $H^{30}$, respectively, flattened and longitudinally slotted at their lower ends, the shaft C passing through the slots thereof, and by reference to Fig. 1 it will be seen that the several feet are laterally placed relatively to the cams to bring the flattened ends into proper operative position relatively thereto adjacent and parallel to the side of each cam farthest from its pinion. Two followers are mounted on each foot on the side of its lower end adjacent its cam, and said followers are herein shown as rolls $r$ $r'$, rotatably mounted on studs above and below the slot, respectively.

While the harness-frames, their feet, the cams, and the means for rotating them have been indicated by different reference characters, I shall indicate all the cam-followers by the reference-letters $r$ $r'$, it being understood that a follower $r$ acts in the lifting, while a follower $r'$ acts in the depressing, of a frame. The two followers are located above and below the center of the coöperating cam, respectively, as herein shown, and the latter is of such shape that both are in engagement with its cam-face, so that there is a direct and continuous control of each harness-frame by its cam, and by reason of this construction and the rigid connection between the harness-frame and the cam the movement of the frame is positive in both directions and free from jars or jumps. I have thus provided a direct double-acting and positive connection between each harness-frame and its actuating instrumentality.

I have referred hereinbefore to the fact that the toothless portion of a cam-pinion has a certain definite angular position relatively to the dwell portion of a cam, and this location is such that when a cam is unlocked and its rotative movement begins its dwell portion will be in coöperative engagement with a follower, so that the movement of the harness-frame will not begin until after the meshing of an actuating-gear and its cam-pinion has been completely effected. This prevents the first teeth which mesh from being subjected to any shock or strain which would tend to break or otherwise injure them and also eliminates any sudden shock or jar in inaugurating the movement of a frame. This will be made clear by examining Fig. 4, wherein the cam No. 2 has just been locked, for the dwell portion 20 of the cam is in coöperation with the follower $r$, and when the teeth of gear $C^2$ and pinion $c^2$ again mesh, unlocking the cam and beginning its rotation, the harness-frame $H^2$ will not begin its movement until the dwell portion has passed entirely beyond the follower $r$. A reference to Fig. 3 will show a similar condition of affairs, for when cam No. 1 is locked the dwell portion 10 thereof will have been brought into coöperation with the follower $r$, and it will not pass beyond it until complete meshing of gear $C'$ and pinion $c'$ has been effected.

To guide the harness-frames in their reciprocating movement, I have herein shown guides $g^\times$ to coöperate with the side bars of the several frames, the guides being conveniently mounted on the pitman-boxes G, and the guides are substantially horizontal bars with vertical recesses or grooves $g'$ in their inner faces. These grooves are purposely made rather wide in order to avoid binding the side bars, and could all of the harness-frames be so arranged that the push or pull of the cams could be transmitted to a point at the center of the frame such guiding means might be sufficient. Inasmuch, however, as the power must be transmitted to some of the harness-frames at one side of the center thereof, as shown in Fig. 1, I have provided means for equalizing the movement of the sides of a frame, so that it will move evenly and truly in its proper path. The arch $A^\times$ is provided with two parallel fulcrum-studs $e^\times$, which project forward above the tops of the harness-frames, and bell-cranks $b'$ $b^2$ are mounted to rock on the studs. The arms of each bell-crank are shown as substantially at right angles to each other, though not necessarily so, and each frame is connected with a bell-crank on each fulcrum-stud, as by links $b^3$, their lower ends being attached to the top of the frame near its sides and their upper ends to the arms $b'$ of the pair of bell-cranks. As shown in Fig. 1, the arms $b'$ extend in the same direction, and to cause the pairs of bell-cranks to rock in the same direction in unison I pivotally connect the upturned arms $b^2$ of each pair by a bar or link $b^4$.

Manifestly the device described will prevent the frame from canting or skewing, more particularly in its lifting movement, and the frame will move evenly up and down with its top and bottom bars horizontal.

I have only lettered one pair of bell-cranks in Fig. 1 with its connections $b^3$, which lead from the harness-frame H', as the operation of the equalizing devices for the other frames will be readily understood from the foregoing.

My invention is not restricted to the precise construction and arrangement herein shown and described, as the same may be modified or changed in various particulars by those skilled in the art without departing from the spirit and scope of my invention.

It is to be understood that when a larger number of harness-frames are used the non-toothed portions of the cam-rotating gears will be changed in extent and the gears will be set on their shaft according to the sequence of movements which are to be given to the harness-frames.

Having fully described my invention, what I claim as new, and desire to secure by Letters Patent, is—

1. In shedding mechanism for looms, a series of independent reciprocating harness-frames, a cam operatively connected with and to effect the reciprocation of each frame, and separate means to cause a predetermined rest period for each harness-frame irrespective of its cam.

2. In shedding mechanism for looms, a series of independent reciprocating harness-frames, a single cam operatively connected with and to effect positively the stroke of each frame in both directions, and means independent of the contour of the cams to lock the harness-frames at rest for predetermined periods.

3. In shedding mechanism for looms, a series of reciprocating harness-frames, a cam operatively connected with and to effect the actuation of each frame, and separate means to lock each frame from movement for a predetermined period.

4. In shedding mechanism for looms, a series of reciprocating harness-frames, a cam having a dwell portion operatively connected with and to effect the actuation of each frame independently of the other frames, and separate means to lock each frame during a predetermined rest period irrespective of the dwell portion of its cam.

5. In shedding mechanism for looms, a series of reciprocating harness-frames, a like number of independently-rotatable actuating-cams operatively connected with the respective harness-frames, to effect the reciprocation thereof, means to rotate the cams, and means to intermittingly lock the cams from movement.

6. In shedding mechanism for looms, a series of reciprocating harness-frames, a like number of independently-rotatable actuating-cams operatively connected with the respective harness-frames, to positively move them in both directions, and means to intermittingly rotate the cams, whereby a harness-frame is maintained stationary during a non-rotative period of its cam.

7. In shedding mechanism for looms, a series of reciprocating harness-frames, an actuating-cam for each, a direct double-acting connection between each cam and the adjacent end of its harness-frame, and means to rotate the cams separately and intermittingly.

8. In shedding mechanism for looms, a series of reciprocating harness-frames, an actuating-cam for each, having a dwell portion to retard the shed-changing movement of the frame, a positive, double-acting connection between each cam and its harness-frame, and means to rotate the cams separately and cause them to remain stationary for predetermined periods, to thereby retain a harness-frame inactive independently of the dwell portion of its cam.

9. In shedding mechanism for looms, a series of vertically-reciprocating harness-frames, an actuating-cam for each, having an attached pinion, a rigid foot depending from each frame and provided with two follower-rolls, to coöperate with the cam, one serving to lift and the other to depress the frame, a supporting-shaft on which the cams are rotatably mounted, a series of actuating-gears rotating in unison and in mesh with the cam-pinions, and means to lock the cams from rotation for a predetermined period in prearranged sequence.

10. In shedding mechanism for looms, a series of vertically-reciprocating harness-frames, an actuating-cam for and operatively connected with each, a mutilated pinion rotatable with each cam, a rotating shaft, and a series of gears fast thereon and adapted to coöperate with and effect rotation of the pinions, each gear having a toothless portion to stop the rotation of and lock its pinion when brought into juxtaposition with the mutilated portion thereof, the toothless portions of the several gears being arranged in predetermined relative angular position.

11. In a shedding mechanism for looms, a vertically-movable harness-frame, a rotatable actuating-cam therefor having a dwell portion, a direct connection between the cam and the frame, to reciprocate the latter positively, and means to rotate the cam intermittingly and lock it from movement when the dwell portion of the cam is in control of the harness-frame.

12. In shedding mechanism for looms, a series of reciprocating harness-frames, means to effect positively the movement of the several frames, and separate means to lock each frame at rest for a predetermined period irrespective of the actuating means therefor.

13. In shedding mechanism for looms, a series of independent reciprocating harness-frames, a separate instrumentality for and to effect a reciprocating movement of each frame, with a dwell, and means acting through each instrumentality to lock a frame at rest for a predetermined period irrespective of the dwell due to said instrumentality.

14. In shedding mechanism for looms, a series of independent reciprocating harness-frames, a like number of individual instrumentalities to effect positively and control directly the movements of the several harness-frames, and indirectly controlling means to lock the latter at rest for predetermined periods irrespective of the directly controlling instrumentalities.

15. In shedding mechanism for looms, a series of reciprocating harness-frames, an intermittingly-rotating cam operatively connected with and to effect the reciprocation of each frame, and means to fully establish the rotative movement of a cam before its harness-frame is set in motion.

16. In a shedding mechanism for looms, a series of reciprocating harness-frames, an actuating-cam for each, having a dwell portion, a connection between each cam and its harness-frame, and means to rotate the cams intermittingly and to lock them from movement for predetermined periods, a cam being unlocked while its dwell portion is still in control of the frame to prevent shock and jar when the movement of the cam begins.

17. In a shedding mechanism for looms, a reciprocating harness-frame, an actuating-cam therefor, having a dwell portion, a double-acting connection between the cam and the harness-frame, and means to intermittingly rotate and lock the cam from movement, said means including a mutilated pinion rotatable with the cam, and a mutilated gear to coöperate with the pinion, juxtaposition of the toothless portions locking the cam, unlocking of the latter, when the gear and pinion begin to mesh, taking place while the dwell portion of the cam is in control of the harness-frame, to prevent shock and strain when meshing is begun.

In testimony whereof I have signed my name to this specification in the presence of two subscribing witnesses.

GEORGE B. AMBLER.

Witnesses:
GEORGE OTIS DRAPER,
ERNEST WARREN WOOD.